United States Patent

[11] 3,537,368

[72] Inventors: Manfred Radtke, Stuttgart-Wangen, Germany
[21] Appl. No.: 805,095
[22] Filed: Feb. 14, 1969
Continuation of application Ser. No. 563,904, July 8, 1966, abandoned.
[45] Patented: Nov. 3, 1970
[73] Assignees: Eastman Kodak Company, Rochester, New York, a corporation of New Jersey
[32] Priority: July 29, 1965
[33] Germany
[31] K51,870

[54] FLASH UNIT FOR PHOTOGRAPHIC PURPOSES
12 Claims, 3 Drawing Figs.
[52] U.S. Cl. .................................. 95/11, 240/1.3, 339/147
[51] Int. Cl. .................................. G03b 19/00
[50] Field of Search .......................... 95/11Misc, 11LAmp, 11.5; 240/1.3, 37, 37.1; 339/147Misc, 147P

[56] References Cited
UNITED STATES PATENTS

| | | | |
|---|---|---|---|
| 3,184,584 | 5/1965 | Bundschuh .................. | 240/1.3 |
| 3,335,651 | 8/1967 | Williams et al. ............. | 95/11 |
| 3,353,465 | 11/1967 | Peterson et al. ............. | 95/11.5 |
| 3,357,329 | 12/1967 | Nerwin ....................... | 95/11 |
| 3,360,639 | 12/1967 | Waggershauser ........... | 240/1.3 |
| 3,374,720 | 3/1968 | Harvey ........................ | 95/11.5 |

Primary Examiner—Norton Ansher
Assistant Examiner—Fred L. Braun
Attorney—Robert W. Hampton and Ronald S. Kareken ABSTRACT: A flash attachment for receiving a single flash lamp having a base structure for insertion in a rotatable socket of a photographic apparatus that is normally used for multiple lamp flash units. The flash attachment is provided with a keying member which cooperates with a fixed structure on the photographic apparatus to prevent indexing rotation of the rotatable socket while the attachment is inserted.

Patented Nov. 3, 1970
3,537,368
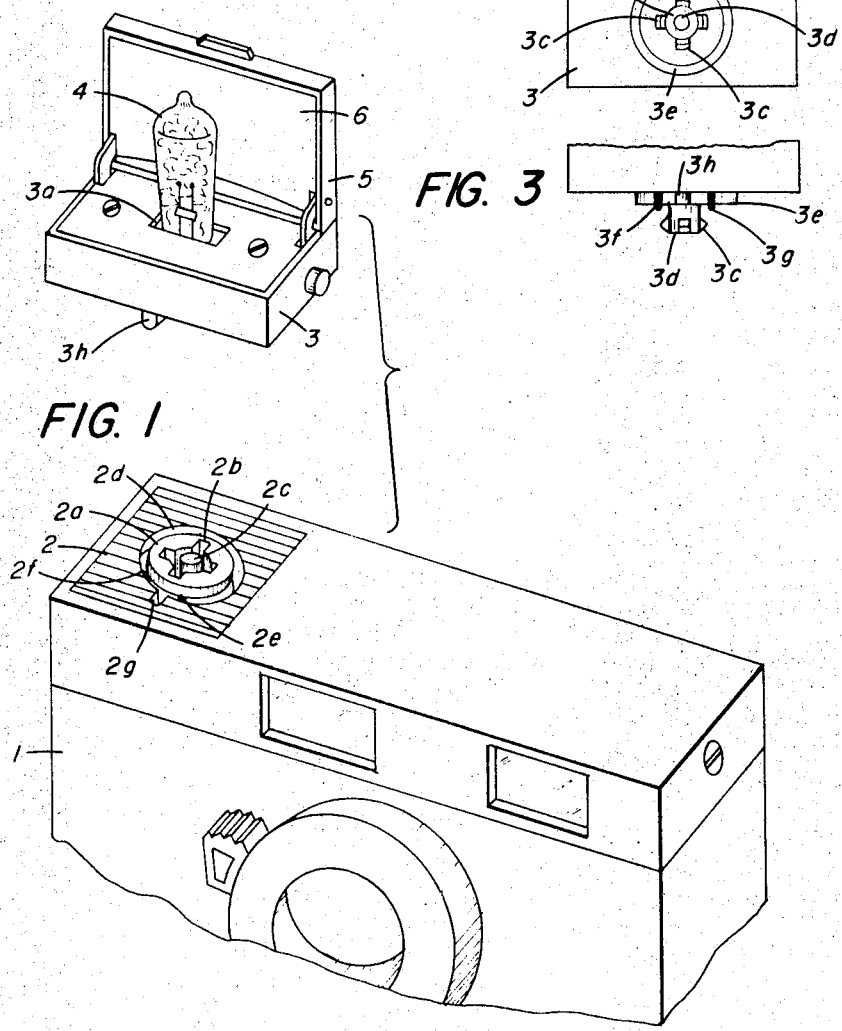
MANFRED RADTKE
INVENTOR.
BY Robert W. Hampton
Ronald S. Kareken
ATTORNEYS

FLASH UNIT FOR PHOTOGRAPHIC PURPOSES

This application is a continuation of application Ser. No. 563,904, filed July 8, 1966, now abandoned.

This invention relates to flash photography, and more particularly, to a flash device used with cameras having a movable socket designed to receive multilamp flash units.

Recently, there have been developed integral multilamp flash units (flashcubes) which contain several flash bulbs and a reflector for each bulb, and corresponding cameras which have socket means to receive and automatically advance the flashcubes with camera operation. In order to adapt such cameras for use with single flash bulbs of known types, I have devised an improved flashcube socket to be incorporated in such cameras and a special detachable flash device to be received by the camera socket in a manner which enables the device to remain in operative position by preventing automatic movement of the device.

An important object of the invention resides, therefore, in the provision of an improved socket in cameras designed to receive multilamp flash units, and a flash device which attaches to the socket and receives individual flash bulbs.

According to the invention, there is provided a flash device comprising a flash bulb socket to detachably retain individual flash bulbs, a current source such as batteries if necessary and an intermediate connecting member for attaching the flash device to the multilamp flash unit receiving socket of a camera. The intermediate connecting member includes key means, such as elevated portions, recesses, projections, pins, or the like which cooperate with corresponding means at the camera receiving socket to prevent rotation of the attached device. At the same time, the key means permits attachment of the flash device only in the correct operative position.

Further objects and advantages of the invention will become apparent in the course of the following description of a preferred embodiment, and the accompanying drawing, in which:

FIG. 1 is a perspective view of a camera with a modified multilamp receiving socket and a separate flash device according to the invention;

FIG. 2 is a bottom view of the flash device shown in FIG. 1; and

FIG. 3 is a partial front view of the flash device.

Referring to the drawing, the receiving socket 2a of the flash assembly 2 built into the photographic camera 1 has a cross-shaped recess slot 2b which detachably receives the connecting base of a flash unit such as a flashcube. The receiving socket 2a is rotatably mounted on the camera flash assembly about a fixed vertical axis and effects advance of the received flashcube (not shown), for example, by a linkage with the film advance mechanism of the camera. Suitable linkages are disclosed in U.S. Pat. No. 3,335,651, which issued Aug. 17, 1967 in the name of Williams et al. and U.S. Pat. No. 3,353,468, which issued Nov. 21, 1967 in the name of Beach. The annular recess 2d serves to receive the contact ring of the aforementioned flashcube and terminal contacts 2e and 2f are arranged in the annular recess 2d to engage the corresponding terminals of the flashcube lamp in the operative position.

According to the present invention, the flash assembly 2 is provided with a keyway or recess 2g in a stationary portion at the part of the assembly adjacent the socket 2a and continuous with the annular recess 2d. The function of keyway 2g will be described.

The flash device 3 (FIGS. 1, 2 and 3) is provided with a flash bulb socket 3a of known construction to detachably receive an individual flash bulb 4, shown here as being an AG-1 bulb. However, it is of course within the scope of the invention to provide a socket 3a which receives other types of known flash bulbs.

A pivotably mounted lid 5, which covers the receiving socket 3a in its inoperative or closed position, is provided at its inner surface with a reflector 6 which is located behind a received bulb when the lid 5 is opened. As can be seen in FIGS. 2 and 3, to connect the device 3 to the camera flash assembly 2, there is provided a connecting base having a centerpost 3b with radially extending retaining lugs 3c and a central bore 3d cooperating with the stabilizing stud 2c in camera flash assembly 2. According to the invention, the connecting base further includes an annular ring 3e having wrapped therearound a pair of electrical leads 3f, 3g, which are electrically connected to respective bulb engaging terminals in the socket 3a. The body of the device 3 may also contain batteries, although batteries will usually be provided in the cameras. Integrally formed with the annular ring 3e is a key or projection 3h at the outer front edge of the ring to be accommodated by the recess 2g when the device 3 is attached.

When attaching the flash device 3 to the flash assembly 2, centerpost 3b is inserted into receiving slot 2b with projection 3h engaging the keyway 2g. A retaining spring within the socket 2a engages the retaining lugs 3c only when the device 3 is fully seated, but full seating is prevented by projection 3h unless the device is properly aligned. The electrical connection of the flash device 3 and assembly 2 to synchronize firing of the bulb with camera operation is produced by engagement of the leads and contacts 3f, 2f and 3g, 2e. Upon insertion of the bulb 4, the camera is ready for effecting a flash exposure. After the flash exposure and removal of the used bulb 4, the camera may be reset by winding film as disclosed in U.S. Pat. No. 3,335,651, but the key means prevents rotation of the flashcube socket 2a and flash device 3 to maintain the device in its operative position for the insertion of a fresh bulb 4.

The invention has been described in detail with particular reference to preferred embodiments thereof, but it will be understood that variations and modifications can be effected within the spirit and scope of the invention as described hereinabove and as defined in the appended claims.

I claim:

1. In a flash assembly having:

a socket for releasably receiving a multiple flash lamp unit, which socket is movable to sequentially index individual flash lamps of said unit into a firing position;

means for moving said socket to index said flash lamps, and the improvement comprising an adaptor having:

means for releasably engaging said socket; and means for preventing movement of said socket when said socket is engaged by said engaging means.

2. In a flash lamp assembly having:

a socket adapted to receive and releasably retain a multiple flash lamp unit, which socket is rotatable to sequentially index individual flash lamps of said unit through a firing position;

means for rotating said socket to index said flash lamps; and means for firing a flash lamp positioned in said firing position;

the improvement comprising an adaptor having:

means for releasably engaging said socket;

flash means;

means engageable by said firing means for firing said flash means; and means for preventing rotation of said socket.

3. In a flash assembly having a stationary portion, a movable socket within the stationary portion to receive a multilamp flash unit including a plurality of photoflash lamps and individual reflectors therefore, and slip means operative to move the socket and a received unit to sequentially index the lamps of the received flash unit in an operative position engaging electrical contacts of the flash assembly for synchronized firing of the lamps with sequential camera operations, the improvement comprising:

a detachable flash device having bulb socket means to receive individual flash bulbs, a connecting base cooperating with the movable socket for attaching the device to the assembly, and electrical leads connecting the assembly contacts to the bulb socket means; and keying means for interengaging the flash device and the flash assembly stationary portion when the device is attached to prevent indexing movement of the movable socket.

4. For use with a flash assembly having a stationary portion, a movable socket within said stationary portion adapted to receive a multilamp flash unit, means located at a firing locus on said stationary portion for firing a lamp of an inserted multilamp flash unit when indexed at said firing locus, and means for indexing said socket to sequentially position individual lamps of a received flash unit at said firing locus, a single-flash lamp adaptor comprising:
 a. means for receiving an individual flash lamp;
 b. a base coupled to said receiving means and insertable in the movable socket of the flash assembly, said base including means for operably associating a lamp inserted in said receiving means with the firing means of said flash assembly; and
 c. means operable on insertion of said adaptor into a flash assembly for coupling said adaptor to the stationary portion of the flash assembly and preventing indexing rotation of the socket when said adaptor is operably inserted therein.

5. The invention defined in claim 4 wherein said means for receiving an individual flash lamp includes electrical contacts, and said means for operably associating an inserted lamp with the flash assembly firing means includes electrical contacts connectable with the electrical firing contacts on a flash assembly upon insertion of said adaptor.

6. In combination, photographic apparatus having a rotatable socket adapted to receive a multilamp flash unit and support said unit for indexing rotation; and an adaptor for use with said apparatus comprising means for operably receiving flash means, means for operably coupling said receiving means and said rotatable socket, and further means for cooperating with said apparatus in a manner preventing indexing rotation of said socket.

7. The invention defined in claim 6 wherein said means for operably coupling said receiving means and said rotatable socket includes base means extending from said receiving means and adapted for mounting in said socket and wherein said rotation preventing means comprises cooperating keying means formed on said apparatus and on said adaptor for interfitting to prevent rotation of said socket.

8. The invention defined in claim 7 wherein said apparatus includes means for electrically firing an inserted flash unit, and said adaptor includes means for operably connecting said firing means to received flash means.

9. For use with a flash mechanism having:
 a socket adapted to receive and releasably retain a multiple flash lamp unit, which socket is movable to sequentially index individual flash lamps of said unit through a firing position; and
 means for moving said socket to index said flash lamps;
 an adaptor comprising:
  means for releasably engaging said socket; and
  means for preventing indexing movement of said socket once said socket has been engaged by said engaging means.

10. In a flash assembly having:
 a first portion;
 a socket on said first portion adapted to releasably receive a multilamp flash unit, said socket having an axis of rotation and being rotatable relative to said first portion about said axis to sequentially index individual flash lamps of said unit into a firing position;
 slip means for rotating said socket to index said flash lamps; and
 the improvement wherein said first portion includes a recess extending radially from said axis, and into which recess a portion of a flash adaptor unit being received by said socket is insertable for preventing rotation of said socket by said slip means.

11. A flash assembly comprising:
 wall means;
 a socket adapted to releasably receive a multiple flash unit, said socket having an axis of rotation and being rotatable relative to said wall means about the axis to sequentially index individual flash lamps of said unit into a firing position; and
 said wall means having means defining a discontinuity eccentric with said socket, and engageable by a portion of a flash adaptor unit being received by said socket for preventing rotation of said socket.

12. A flash assembly according to claim 11 wherein said means defining a discontinuity comprises a keyway extending radially from the axis of rotation of said socket.